United States Patent [19]

Weishew

[11] 4,281,556
[45] Aug. 4, 1981

[54] DUAL CARRIAGE RECIPROCATOR WITH CONTINUOUSLY MOVING CHAIN

[76] Inventor: Joseph F. Weishew, 3934 Davisville Rd., Hatboro, Pa. 19040

[21] Appl. No.: 54,291

[22] Filed: Jul. 2, 1979

[51] Int. Cl.³ .................. F16H 19/06; F16H 37/00
[52] U.S. Cl. ............................................ 74/37; 74/828; 74/110
[58] Field of Search .............. 74/37, 828, 829, 830, 74/831, 110, 89.2, 89.21, 89.22

[56] References Cited

U.S. PATENT DOCUMENTS

| | | | |
|---|---|---|---|
| 2,351,183 | 6/1944 | Blackburn | 74/37 |
| 2,462,060 | 2/1949 | Bartelt | 74/37 |
| 4,042,072 | 8/1977 | Baba | 188/72.4 |
| 4,084,681 | 4/1978 | Heinzl, et al. | 74/37 |

FOREIGN PATENT DOCUMENTS

| | | | |
|---|---|---|---|
| 484006 | 10/1925 | Fed. Rep. of Germany | 74/37 |
| 58099 | 9/1969 | Poland | 74/37 |

*Primary Examiner*—Lawrence J. Staab
*Attorney, Agent, or Firm*—Robert J. Mooney

[57] ABSTRACT

A first carriage, which is arranged to vertically reciprocate within a first housing, is provided with two air clutches and a continuously moving chain. The chain is arranged to move over co-planar spaced sprockets so as to present one direction of chain motion to the left side of the carriage and a second direction of chain motion to the right side of the carriage. The carriage is also provided with two chain engaging sprockets each controlled by a respective one of two air clutches. The chain engaging sprockets on the carriage normally idle with chain motion. However, actuation of one of the controlling air clutches halts the spinning of its associated sprocket and forces the sprocket and clutch to act as a unit to thereby move the carriage upwardly or downwardly along the length of the chain in a direction dependent upon which portion of the continuously moving chain was so engaged. Means are provided to automatically reverse the stroke, to vary the length of the stroke and to vary the speed of the stroke.

A second carriage, which is arranged to vertically reciprocate in a second housing adjacent to the first housing, is provided with a chain engagement means. A suitably arranged second chain interconnects the first and second carriages. Reciprocation of the first carriage causes reciprocation of the second carriage. The chain engagement means permits securement of the second carriage to any selected portion of the second chain. This adjustable connection permits an operator to select a variety of stroke patterns for the second carriage.

4 Claims, 9 Drawing Figures

DUAL CARRIAGE RECIPROCATOR WITH CONTINUOUSLY MOVING CHAIN

BACKGROUND OF THE INVENTION

This invention is directed to a dual vertical carriage reciprocator. This invention is related to a class of devices known as chain reciprocators.

Present day chain reciprocators have carriages connected directly to a chain. Reciprocation of the carriage is achieved by reversing the motion of the chain. Reversal of chain motion can have detrimental effects especially in those applications where high speed, short stroke carriage reciprocation is required. In such applications and others the chain life is shortened since the chain is required to take most of the inertial shock of carriage reversal. In addition, in high speed, short stroke reciprocation environments, one section of the chain tends to wear excessively which usually leads to differential wear of the sprocket teeth and resultant chain slap.

Dual carriage reciprocators are also known. However, so far as is known, such devices are not provided with means to selectively adjust the position of the second of two carriages with respect to the first. When provided with means to adjust the relative position of two carriages, a dual carriage reciprocator can be arranged to produce a variety of coordinated carriage stroke patterns. Hence, with simple adjustments, one carriage reciprocator is able to perform the function of many such reciprocators.

SUMMARY OF THE INVENTION

Accordingly, it is an object of this invention to provide a dual vertical carriage reciprocator having a main carriage arranged to be moved by a first chain which continuously runs in one direction and wherein most of the inertial shock of main carriage reversal is absorbed by the main carriage itself. It is a further object of this invention to provide a device wherein all of the first chain is used, wherein device longevity and reliability are increased, wherein the velocity and relative positioning of both carriages are controllable, wherein chain life is extended and wherein a unique arrangement of air clutches, chain sprockets and associated elements, are arranged to automatically achieve carriage reciprocation along an adjustable stroke length.

It is a further object of this invention to provide a dual carriage reciprocator wherein the position of an auxiliary carriage is selectively adjustable with respect to the position of the main carriage and wherein the strokes of both the auxiliary and main carriages can be coordinated to produce a variety of desirable stroke patterns. These and other objects of the invention are achieved as follows.

A main carriage is provided with two air clutches each of which controls a respective one of two carriage mounted chain sprockets. The main carriage is arranged to move along two horizontally spaced co-planar rails which are each separately attached to a main housing. The main housing supports a variable speed motor which is arranged to continuously drive an elongated roller chain around two vertically spaced co-planar sprockets. The continuously moving chain lies in a plane which is parallel to and situated between the carriage plane and the plane of the rails.

The continuously running chain presents one direction of chain motion to the left side of the main carriage and an opposite direction of chain motion to the right side of the main carriage. One of the carriage mounted sprockets engages the chain near the left side of the main carriage and the other carriage mounted sprocket engages the chain near the right side of the main carriage. Each of the carriage mounted sprockets is arranged to normally idle with chain motion and the carriage is then normally stationary. However, actuation of an air clutch prevents its associated sprocket from spinning with chain motion and effectively locks that sprocket and clutch to the chain. Since each clutch is fixedly secured to the main carriage, the main carriage will be carried along the rails by the chain in either an upward or downward direction depending upon which portion of the chain was so engaged. The main carriage will move in one direction until the then operative clutch is de-actuated and the other clutch is actuated whereupon the main carriage reverses direction.

Automatic actuation and de-actuation of the two air clutches on the main carriage is achieved with the use of a four way, two position, pilot operated spool valve which is also mounted on the main carriage and which is provided with a suitable source of compressed air. Two control shafts extend from either side of the spool valve. Each of the control shafts is arranged to eventually contact a respective one of two shock absorbers which are each adjustably secured to opposite ends of the main housing. The spool valve is arranged to actuate one clutch while simultaneously deactivating the other.

When air is supplied to the spool valve it is arranged to automatically assume one of two positions and actuate one of the two clutches. The main carriage will move in a particular direction until one of the spool valve control shafts contacts one of the two vertically spaced shock absorbers. At the moment of contact the spool valve assumes its other position deactuating the then operative air clutch and actuating the then inoperative air clutch. In this manner, the direction of the main carriage is automatically reversed and the main carriage is caused to reciprocate between the two shock absorbers.

An auxiliary carriage is provided with a chain engagement means and is arranged to reciprocate along parallel rails within an auxiliary housing which is adjacent to the main housing. The auxiliary carriage and the main carriage are interconnected by a second chain which passes over idler sprockets located in the upper end of both the main and auxiliary housings. The second chain is fixedly secured to the main carriage and is adjustably secured to the auxiliary carriage via the chain engagement means. Manipulation of the chain engagement means allows an operator to secure the auxiliary carriage to any selected portion of the second chain.

As the main carriage reciprocates, the auxiliary carriage reciprocates in opposite directions. However, since the auxiliary carriage is selectively securable to the second chain, and since the stroke length of the main carriage is adjustable, the stroke patterns of both carriages can be adjusted to produce a variety of fully overlapping patterns, non-overlapping patterns or partially overlapping patterns.

These and other objects and advantages will be more fully understood from the following description in conjunction with the accompanying drawings wherein like reference numerals indicate like parts throughout.

DESCRIPTION OF THE PREFERRED EMBODIMENT

Figure 1:
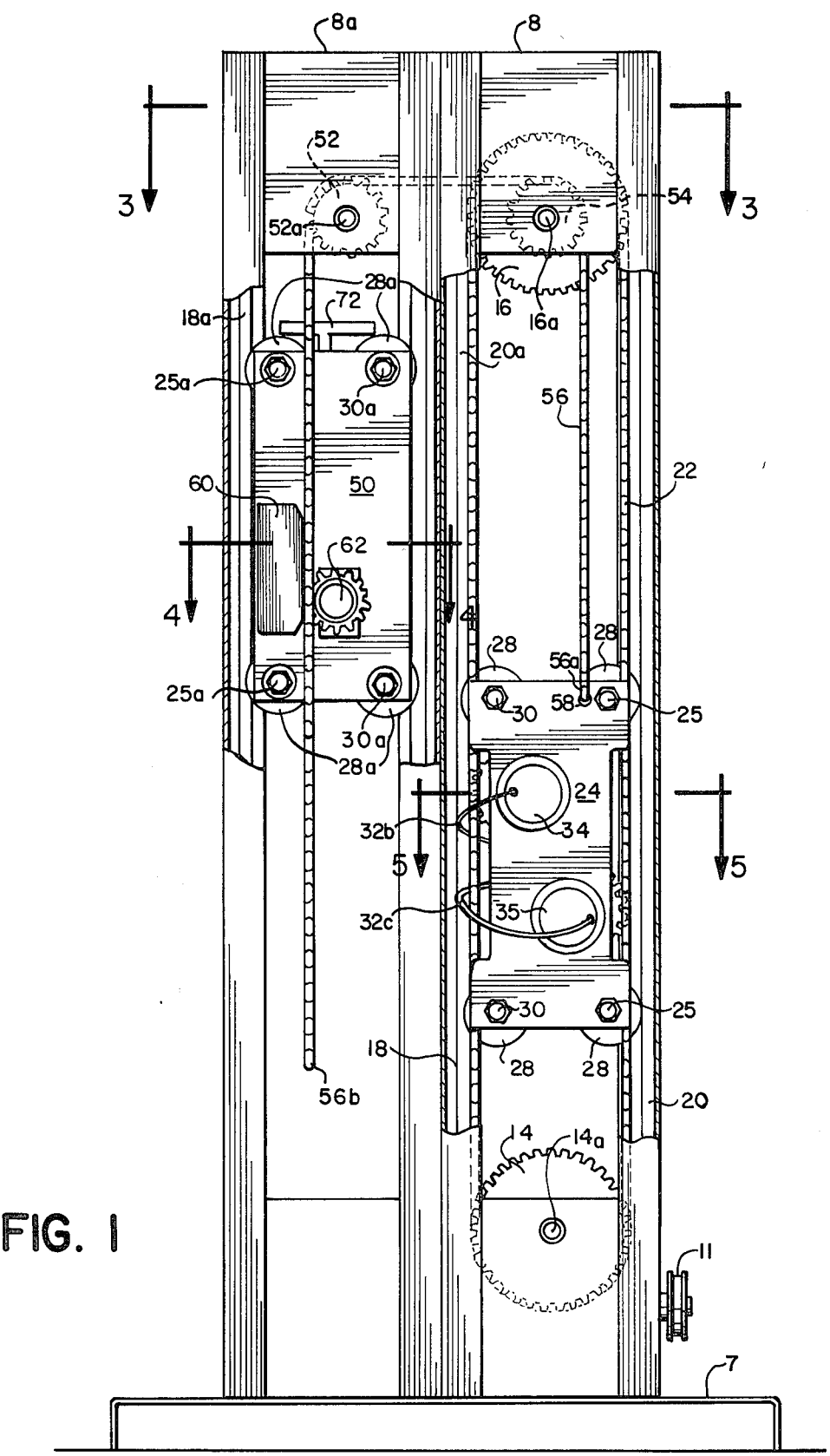
FIG. 1 is a front elevational view of a dual vertical carriage reciprocator according to this invention; for clarity of presentation some of the elements are shown broken away.
Figure 2:
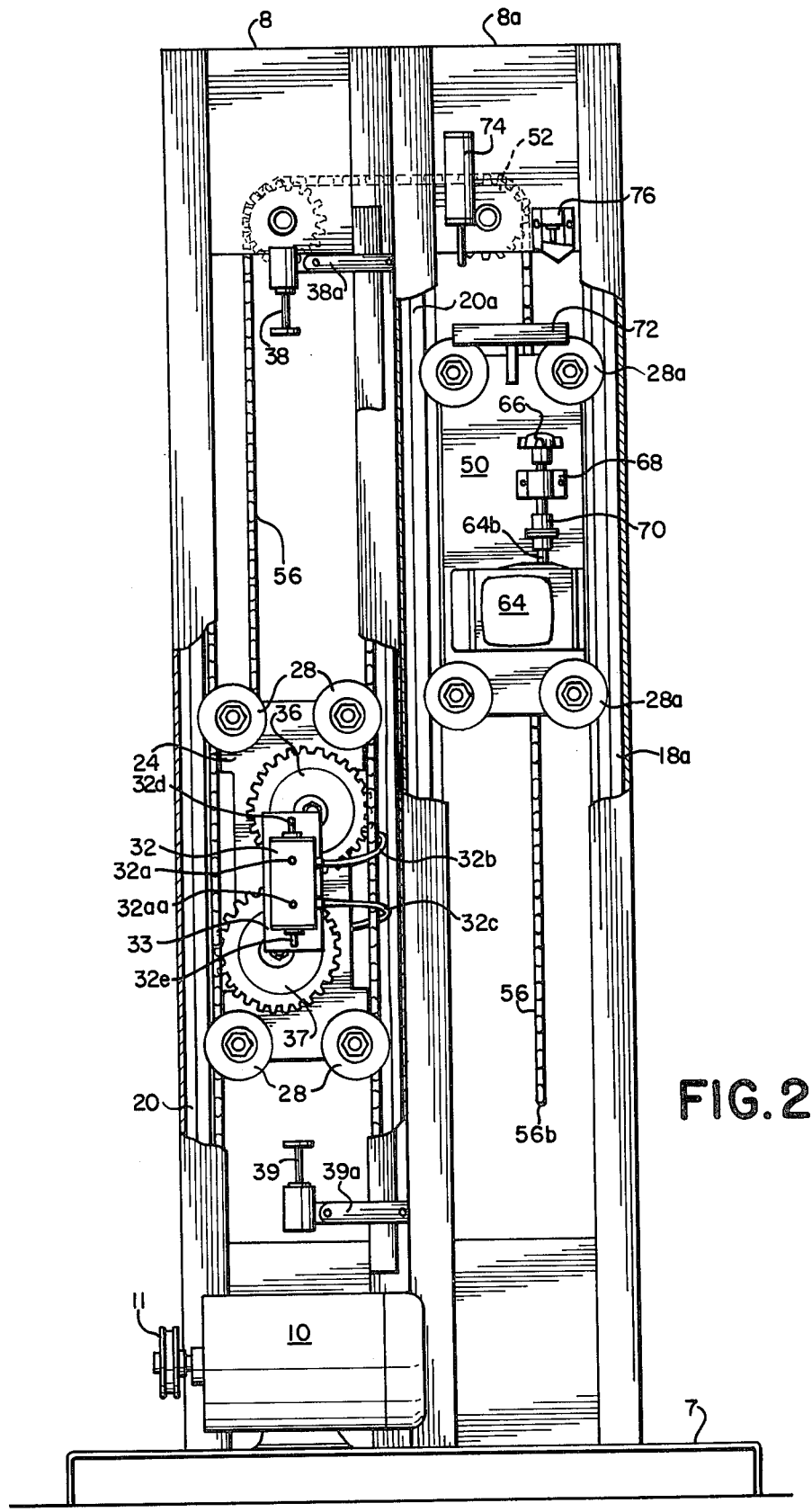
FIG. 2 is a rear elevational view of the carriage reciprocator shown in FIG. 1 some of the elements of which are also shown partially broken away.
Figure 3:
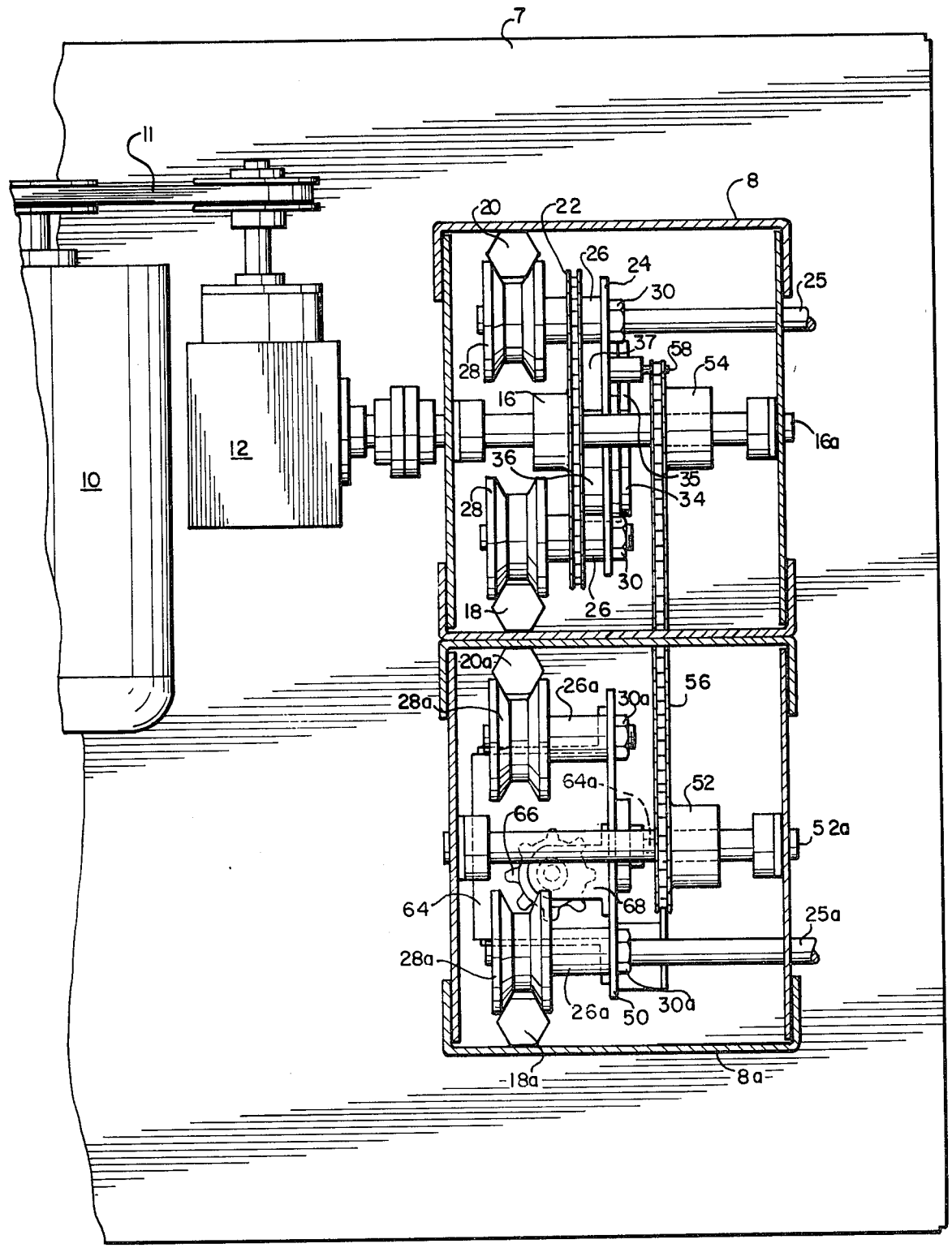
FIG. 3 is a downward looking sectional view taken along the lines 3—3 in FIG. 1.

Referring to FIGS. 1, 2 and 3, the dual vertical carriage reciprocator includes a conventional electric motor 10 which is conventionally arranged to turn a driven sprocket 14 by means of a conventional drivebelt and pulley system 11 operating through a conventional speed reducer 12. An idler sprocket 16, vertically spaced from, but in the same plane as, the driven sprocket 14, is also provided. A continuous roller chain 22 extends around and between the driven sprocket 14 and the idler sprocket 16. A left rail 18 and a right rail 20, parallel to each other, are also provided. The vertically disposed rails 18, 20 have hexagonal cross-sections. The rails 18, 20 lie in a plane parallel to but behind the plane in which the sprockets 14, 16 and the chain 22 lie.

The driven sprocket 14 and the idler sprocket 16 are mounted for rotation upon respective shafts 14a, 16a which are journeled into a vertically disposed housing 8. The rails 18, 20 are secured to the sides of the housing 8. The motor 10 and speed reducer are secured to a platform 7, which supports the housing 8 and an identical companion housing 8a.

A generally rectangular main carriage 24 rides on and between the left and right rails 18, 20. Four parallel and spaced shafts 26 project rearwardly from the carriage 24 (See FIG. 3). The shafts 26 are secured to the carriage 24 by any conventional means such as bolts 30. Each shaft 26 is provided with a wheel 28 which is rotatably mounted thereon. Two of the wheels 28 are arranged to move along the left rail 18 and the other two wheels 28 are arranged to move along the right rail 20. The carriage 24 is provided with at least two support studs 25 which may be secured to the main carriage 24 in any suitable fashion and upon which any suitable element, such as a spray gun, SG, may be supported (see FIG. 8). The support studs 25 project outwardly from the carriage 24 and may conveniently be rendered as extensions of the rearwardly projecting shafts 26.

Upon the carriage 24 are mounted a four way spool valve 32, two identical air clutches 34, 35 and two identical carriage chain sprockets 36, 37. The spool valve 32 is secured to the rear of the carriage 24 with a T-shaped support 33.

With further reference to FIG. 2, the spool valve 32 is provided with an air inlet 32a and air output 32aa. Compressed air is fed to the inlet 32a from a controllable source (not shown) through a hose (not shown) of appropriate length. Each of the two air control lines 32b, 32c extends from the spool valve 32 to a respective one of the two air clutches 34, 35. Each of two spool valve control shafts 32d, 32e extend from a respective side of the spool valve 32 in a plane parallel to the plane in which the chain 22 lies.

Each of the two shock absorbers 38, 39 is adjustably set opposite a respective one of the two spool valve control shafts 32d, 32e. Each of the two shock absorbers 38, 39 is movably mounted on the housing 8 with a respective one of two support bars 38a, 39a which are slidably secured to the housing 8. The distance between the shock absorbers 38, 39 is defined as the stroke of the carriage 24. The stroke may be made smaller or larger by adjusting the distance between the shock absorbers 38, 39. (As will be made clearer below, when one of the two air clutches 34, 35 is actuated, the carriage 24 will move in one direction until one of the two spool valve control shafts 32d, 32e contacts a respective one of the two shock absorbers 38, 39. At the moment of contact, the spool valve 32 automatically deactivates the operative one of the two air clutches 34, 35 and actuates its counterpart. This action causes the carriage 24 to move in an opposite direction until the other one of the two spool valve control shafts 32d, 32e contacts the other one of the two shock absorbers 38, 39. In this manner, the carriage 24 is caused to reciprocate between the two shock absorbers 38, 39.)

Figure 5A:
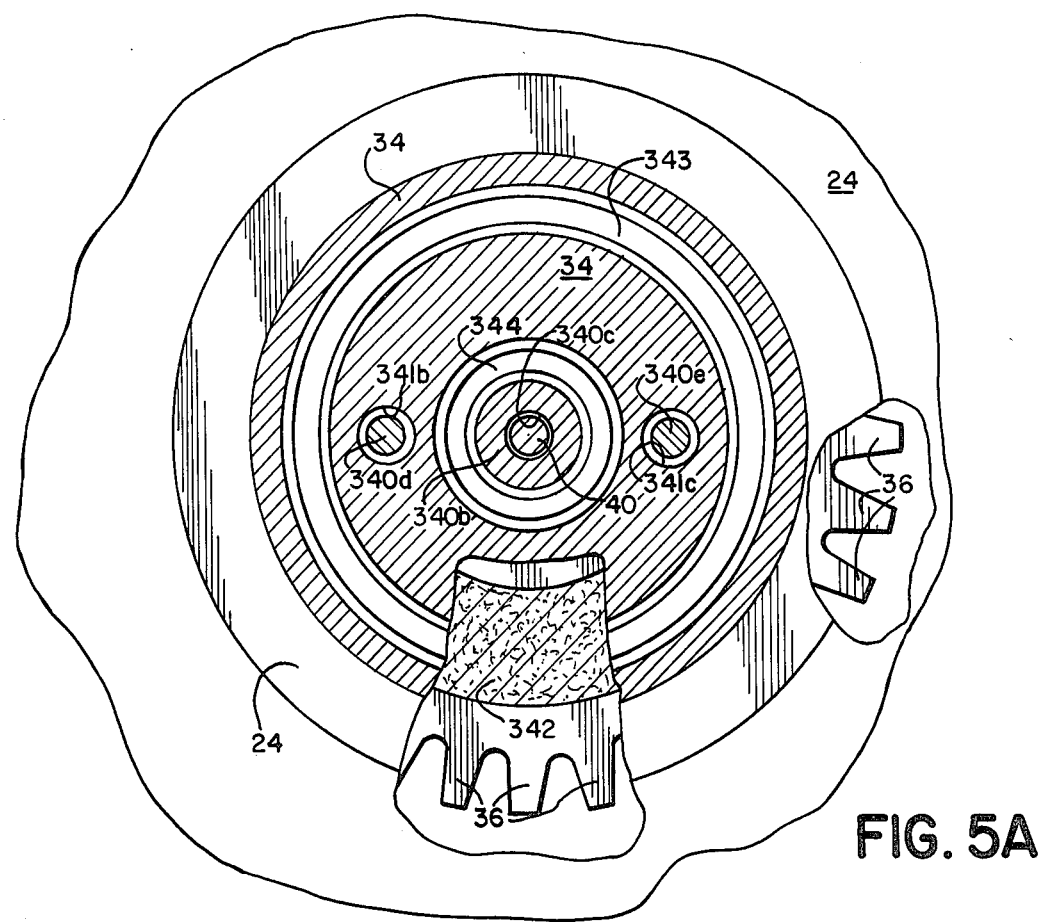
FIG. 5A is a cross-sectional view along the lines 5A—5A in FIG. 5.
Figure 5:
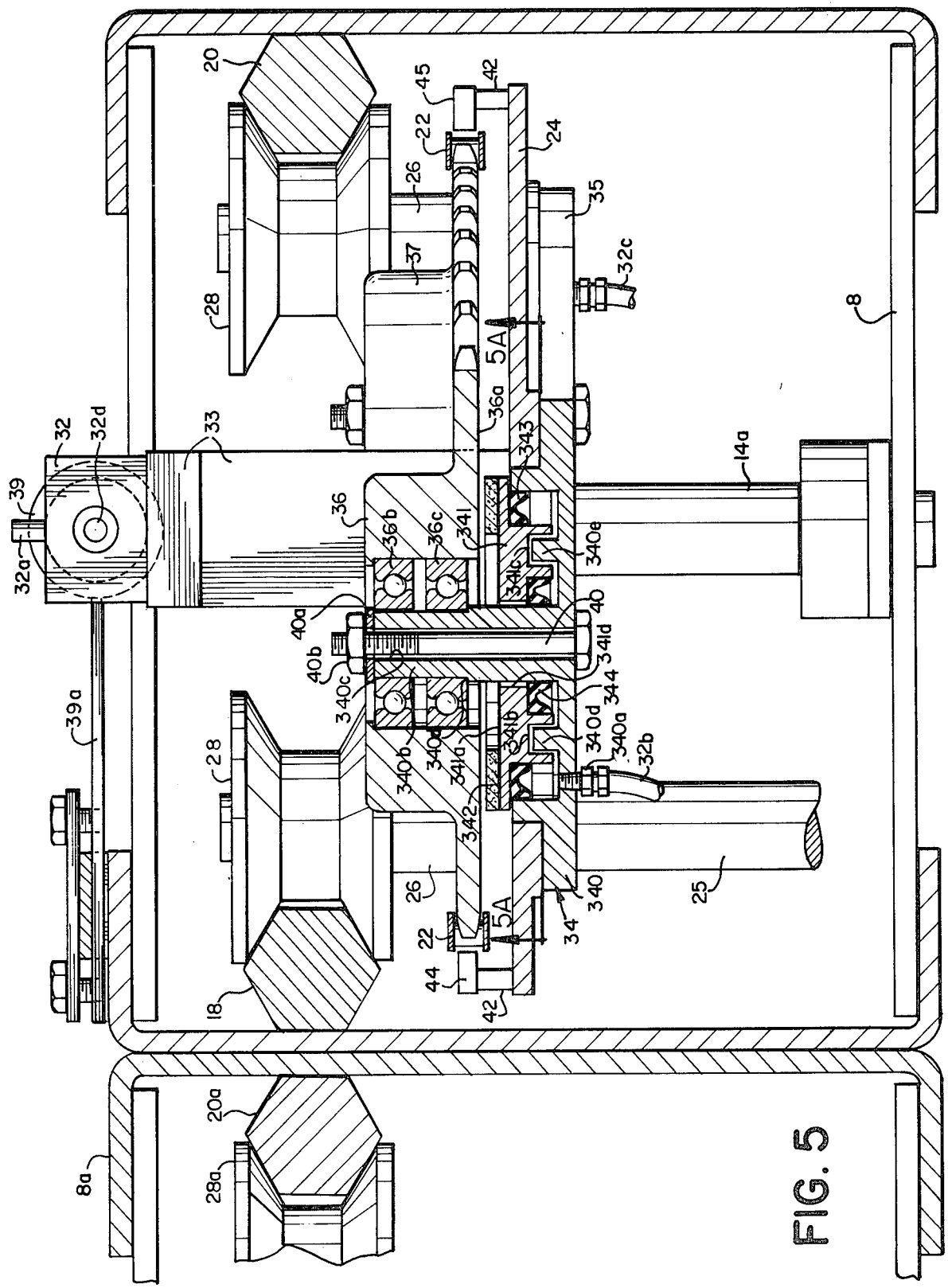
FIG. 5 is a downward looking sectional view taken along the lines 5—5 in FIG. 1.

Referring to FIG. 5, which is a cross-section, along the line 5—5, of the device shown in FIG. 1, a detailed view of one of the two identical air clutches 34, 35 and of one of the two identical carriage chain sprockets 36, 37 is shown.

The air clutch 34 includes three major elements: a clutch cylinder 340, which is secured to and stationary with respect to the carriage 24, a clutch piston 341 which is axially movable with respect to the clutch cylinder 340, and a friction liner 342 which is secured to the flat head 341a of the clutch piston 341.

The clutch cylinder 340 is substantially circular in shape and is rigidly secured to the carriage 24 by any suitable means (not shown). The clutch cylinder 340 is provided with an air inlet/outlet port 340a which accommodates the air control line 32b. The clutch cylinder 34 is also provided with an internal centrally located, elongated, cylindrically shaped hub 340b which is flanked by two cylindrically shaped lugs 340d, 340e. The clutch piston 341 is also substantially circular in shape. One side, defined as the piston head 341a, faces a land 36a on the carriage chain sprocket 36; the other side of the clutch piston 341 is provided with two circular recesses 341b, 341c which flank a circular hole 341d which is concentric with the hub 340b of the clutch cylinder 340. Each of the two lugs 340d, 340e on the clutch cylinder 340 normally repose within a respective one of the two recesses 341b, 341c in piston 341. (See FIG. 5a). This arrangement prevents the piston 341 from rotating with respect to the clutch cylinder 340 but allows the piston 341 to slide along the hub 340b of the cylinder 340.

The clutch piston also includes a ring shaped friction liner 342 which is secured to the piston head 341a by conventional means (not shown). Two cup-shaped "O"-rings 343, 344 prevent air leakage as the piston 341 moves along the hub 340b.

With further reference to FIG. 5, a detailed view of one of the carriage chain sprockets 36, 37 is also shown. The sprocket 36 is conventional in design and is arranged to normally rotate on a reduced diameter portion of the hub 340b of the clutch cylinder 340. Two captured roller bearings 36b, 36c are provided. A threaded bolt 40, which extends from the face of the clutch cylinder 340 and through a bore 340c in the hub 340b, is provided with a washer 40a and a nut 40b. The two bearings 36b, 36c, repose between the washer 40a and the shoulder 340d of the reduced diameter portion of the hub 340b. This arrangement insures not only that the sprocket 36 freely rotates but also that a preferred distance is maintained between the land 36a of the sprocket 36 and the friction liner 342 when no compressed air is introduced into the air inlet outlet port 340a.

With further reference to FIG. 5, the carriage 24 is also provided with four identical spacers 42 (two of which are shown) which project from the carriage 24 toward the chain 22. The spacers 42 support left and right chain guide rails 44, 45. Both chain guide rails 44, 45 extend the length of the carriage 24 and insure proper registration of the chain 22 with each of the two carriage chain sprockets 36, 37.

Figure 6:
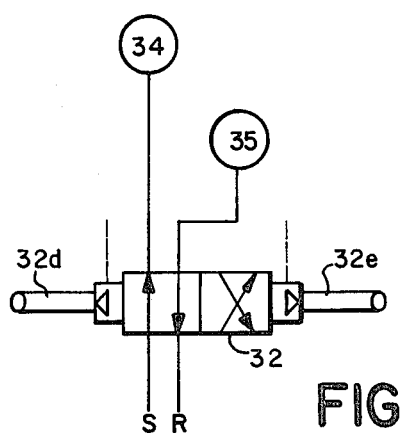
FIG. 6 is a schematic diagram of two air clutches and a controlling spool valve, all of which are part of the device shown in the foregoing figures.

In FIG. 6, a schematic diagram of the spool valve 32 and the clutches 34, 35 is presented. With the spool valve in the first position shown in FIG. 6, the upper clutch 34 is connected to a source, S, of compressed air and the lower clutch 35 is connected to an air return R. Hence the upper clutch 34 is actuated and the lower clutch 35 is deactuated.

The spool valve 32 is a four way, pilot operated, two position device of conventional design. As is well known, the spool valve 32 operates on a pressure differential principal. Actuation of, for example, the control shaft 32d exhausts its associated pilot operator to atmosphere to thereby create a pressure differential within a poppet chamber (not shown) which causes the poppets (not shown) to shift. The spool valve 32 then assumes its second position and the poppets are locked until the other control shaft 32e is actuated. When the spool valve 32 assumes the second position, the lower clutch 35 is connected to the source of compressed air, S, and the upper clutch 34 is connected to the return, R. Hence, in the second position, the upper clutch 34 is deactuated and the lower clutch 35 is actuated.

Figure 7:
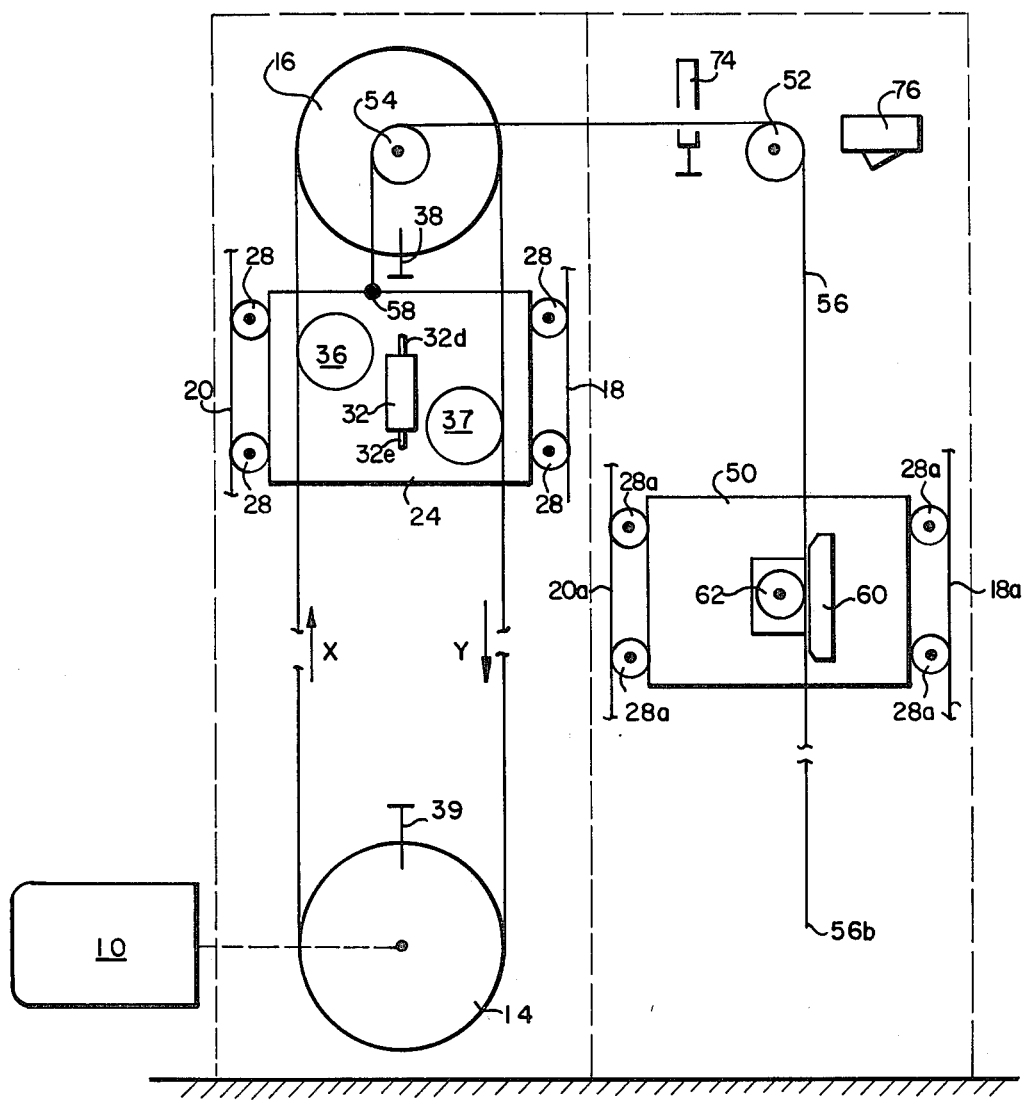
FIG. 7 is a schematic diagram of the device shown in the foregoing figures which illustrates the interrelationship of various elements of the invention.

With reference to FIG. 7, the main carriage operates as follows. When the electric motor 10 is energized, the chain 22 runs continuously in, for example, a clockwise direction at a selectable speed. The main carriage 24 is initially stationary. When compressed air, at 75 psi for example, is introduced into the air inlet/outlet port 32a of the spool valve 32, one of the two air clutches 34, 35 is actuated depending upon the initial condition of the spool valve 32. If the upper air clutch 34 is actuated, its piston 341 will slide along its hub 340b by the force of the compressed air until the friction liner 342 engages the land 36a on the carriage chain sprocket 36. Before the liner 342 makes contact, the sprocket 36 idly spins with the motion of the chain 22. However, once the liner 342 fully abuts the sprocket land 36a, the sprocket 36 is no longer free to turn. Hence the sprocket 36, chain 22, and clutch 34 are effectively locked together. Since the clutch 34 is secured to the carriage 24, the carriage will move upwardly in chain direction "X".

The main carriage 24 will move upwardly until the upper spool valve control shaft 32d encounters the upper shock absorber 38 at which time the upper clutch 34 is deactuated and the lower clutch 35 is actuated. When pressurized air is supplied to the lower clutch 35, it locks or brakes its associated carriage sprocket 37 in the same manner and the main carriage 24 then travels downwardly in chain direction "Y" until the lower spool valve control shaft 32e encounters the lower shock absorber 39. When contact is made, the direction of the main carriage 24 is again reversed. The carriage 24 will continue to reciprocate until pressurized air is no longer supplied to the spool valve 32 or the chain 22 is halted.

It should be clear that each of the two air clutches 34, 35 acts as a selectively actuable brake for a respective one of the two carriage sprockets 36, 37. A unique design feature of the air clutch 34 is the absence of any biasing element which would act to return the clutch piston 341 to the unengaged position (shown in FIG. 5) when pressurized air is no longer supplied to the clutch 34. Through experimentation it was discovered that when pressurized air is removed from the clutch 34, the rotational movement of the freed sprocket 36, among other supposed things, creates enough force against the liner 342 and piston 341 to push these united elements away from the land 36a on the sprocket 36 so that they assume the unengaged position portrayed in FIG. 5.

Thus far the description of the invention has been confined to a description of the main carriage 24 and the means employed to impart a reciprocatory motion to it. The main carriage 24 works in conjunction with an auxiliary carriage 50 which will now be described along with its associated elements.

With initial reference to FIGS. 1 and 2, the rectangular auxiliary carriage 50 is arranged to repose within the companion housing 8a. As in the case of the main carriage 24, the auxiliary carriage 50 rides on and between elongated, hexagonal parallel left and right rails 18a, 20a which are secured to the sides of the companion housing 8a. Four parallel and spaced shafts 26a project rearwardly from the auxiliary carriage 50. (See FIG. 3). The shafts 26a are secured to the auxiliary carriage 50 by any conventional means such as bolts 30a. Each shaft 26a is provided with a wheel 28a which is rotatably mounted thereon. Two of the wheels 28a are arranged to move along the left rail 18a and the other two wheels are arranged to move along the right rail 20a. The auxiliary carriage 50 is provided with at least two support studs 25a which may be secured to the auxiliary carriage 50 in any suitable fashion and upon which any suitable element, such as a spray gun, SG, may be mounted. (See FIG. 8). The support studs 25a project outwardly from the auxiliary carriage 50 and may conveniently be rendered as extensions of the rearwardly projecting shafts 26a. The auxiliary carriage 50 acts as a counterweight for the main carriage 24.

A first auxiliary idler sprocket 52 is mounted for rotation upon a shaft 52a which is journaled into the upper portion of the companion housing 8a. The first auxiliary idler sprocket 52 works in conjunction with a second auxiliary idler sprocket 54 which is mounted for rotation on the shaft 16a of the idler sprocket 16 located in the main housing 8.

A roller chain 56, known as the climbing chain, passes over and engages both auxiliary idler sprockets 52, 54. One end 56a of the climbing chain 56, is fixedly secured to the main carriage with a pin 58. The other end 56b of the climbing chain 56 is free. The climbing chain 56 passes over the front of the auxiliary carriage 50 and between a chain guide plate 60 and a climbing sprocket 62, both of which are mounted on the auxiliary carriage 50. The chain guide plate 60 insures that the climbing chain 56 and the climbing sprocket 62 are fully engaged. The climbing sprocket 62 is controlled by the output shaft 64a of a conventional gear reduction unit 64 which is secured to the rear of the auxiliary carriage 50 with angle irons 67 and bolts 69 (See FIG. 4).

The gear reduction unit 64 is of the well known worm-worm type. Hence, as is well known, the output shaft 64a of the gear reduction unit 64 will not rotate unless and until the gear reduction unit 64 is deliberately manipulated. Therefore, the climbing sprocket 62 is and can be effectively locked to the climbing chain 56 at any selected point along that portion of the climbing chain 56 located in the companion housing 8a.

Figure 4:
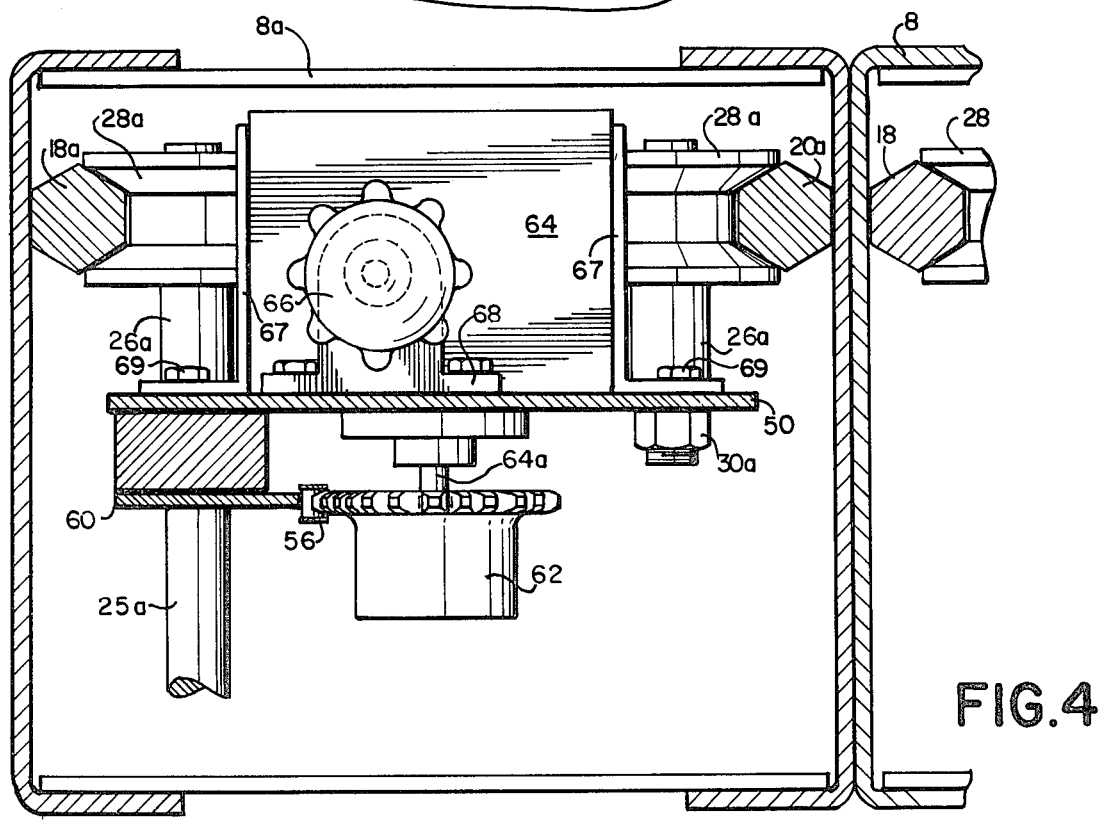
FIG. 4 is a downward looking sectional view taken along the lines 4—4 in FIG. 1.

With reference to FIGS. 2 and 4, control of the gear reduction unit 64 is achieved with a turnable handle 66 which is connected to the input shaft 64b of the gear reduction unit 64 through a pillow-block 68 and flexible coupling 70. By turning the handle 66 in the appropriate direction, the operator of the device can cause the auxiliary carriage to climb either up or down the climbing chain 56 to thereby cause the auxiliary carriage 50 to assume virtually any desired position with respect to the main carriage 24.

It should be clear from the foregoing that the auxiliary carriage 50 is connected to the main carriage 24 by means of the climbing chain 56. The connection of the climbing chain 56 to the main carriage 24 is unchangable since the pin 58 secures the climbing chain 56 to the main carriage 24. However, the connection of the climbing chain 56 to the auxiliary carriage 50 is changable since the climbing sprocket 62, and hence the auxiliary carriage 50, can be moved to virtually any selected point along that portion of the climbing chain 56 located in the companion housing 8a (See FIG. 7).

When the main carriage 24 reciprocates, the auxiliary carriage 50 will reciprocate in an opposite direction. Since the position of the auxiliary carriage 50 with respect to the main carriage 24 can be made to vary, means must be provided to automatically remedy an operator error in positioning the auxiliary carriage 50. In particular, means are provided to prevent an upward override of the auxiliary carriage 50. These means include an engaging plate 72 secured to the upper end of the auxiliary carriage as well as a shock absorber 74 and an air supply cut out valve 76 secured to the upper end of the companion housing 8a.

If the auxiliary carriage 50 is inadvertently mispositioned with respect to the stroke of the main carriage 24, the engaging plate 72 will contact the shock absorber 74 and the cut out valve 76 before the auxiliary carriage 50 overrides the idler sprocket 52 located in the upper portion of the companion housing 8a. When the resetable cut out valve 76 is operated by the engaging plate 72, the air supply, S, to the spool valve 32 is cut off and the carriages cease to move. The shock of the impact is taken up by the shock absorber 74.

It is clear that the connection point of the auxiliary carriage 50 to the climbing chain 56 can be varied. It is also clear that the stroke length of the main carriage 24 can be varied by varying the distance between the slidable shock absorbers 38, 39. It should also be clear that the position of the stroke of the main carriage 24 with respect to the main housing 8 can also be varied by judicious placement of the slidable shock absorbers 38, 39. For example, the shock absorbers 38, 39 may be placed the maximum distance apart as in FIG. 2 whence the main carriage 24 will reciprocate the maximum extent possible; or one of the shock absorbers 38, 39 may be placed at, for example, the midpoint of the main housing 8 whence the main carriage 24 will reciprocate half the maximum extent possible in either the upper or lower portion of the main housing 8 depending upon which of the two shock absorbers 38, 39 was so placed.

Thus with suitable adjustments of the connection point of the auxiliary carriage 50 to the climbing chain 56, a variety of reciprocating stroke patterns can be produced. For example, both the main carriage 24 and the auxiliary carriage 50 can cover the maximum stroke possible in opposite directions; or the stroke of the main carriage 24 can be shortened with a corresponding shortening of the stroke of the auxiliary carriage 50; or the stroke of the main carriage 24 can be shortened and the auxiliary carriage 50 moved along the climbing chain 56 so that the stroke of the auxiliary carriage 56 is also shortened but both carriages 24, 50 traverse the same overlapping stroke but in opposite directions; or, the stroke of the main carriage 24 can be shortened and the auxiliary carriage 50 moved along the climbing chain 56 until its stroke is equal in distance to, but does not overlap, the stroke of the main carriage 24.

Figure 8:
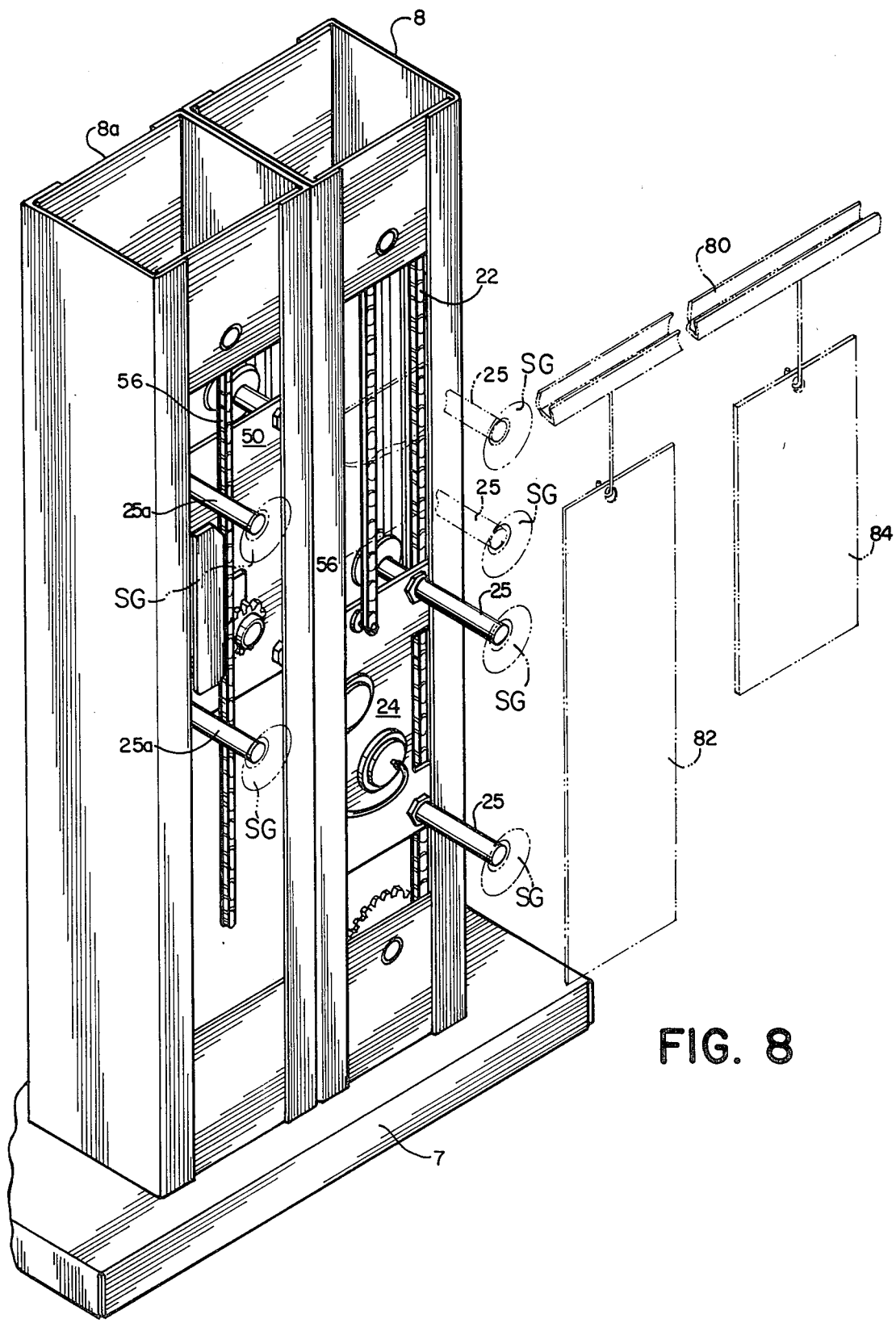
FIG. 8 is an isometric view of the invention which is partially phantomed to illustrate the use of the invention.

To better portray the versitility of the invention, FIG. 8 is presented as an isometric view of the invention in use as a means for supporting and reciprocating paint spray guns, SG. The spray guns, SG, are shown in phantom without input lines for clarity of presentation.

In one typical application, the invention is placed at a paint spray station and an array of articles to be painted is conveyed to and past the station by means of a conveyor 80. In a typical application, several hundred or several thousand elongated articles 82 are followed by several hundred or several thousand short articles 84. In painting the elongated articles 82, the operator adjusts the stroke so that both carriages 24, 50 traverse the maximum stroke desired or possible; or, alternatively, the stroke of the carriages 24, 50 may be so adjusted that the auxiliary carriage 50 reciprocates in the upper half of the companion housing 8a and the main carriage 24 reciprocates in the lower half of the main housing 8.

In painting the short articles 84, the operator stops the conveyor 80 and adjusts the stroke so that both carriages 24, 50 reciproccate in the upper half of their respective housings 8, 8a, as shwn by the phantomed position of the main carriage 24 in FIG. 8.

I claim:
1. A dual vertical carriage reciprocator comprising:
a first housing;
a first carriage movably mounted in said first housing;
a first chain movably mounted in said housing and arranged to continuously present a first chain portion, moving in an upwardly direction, to one side of said first carriage and a second chain portion, moving in a downwardly direction, to an opposite side of said first carriage;

means, secured to the first housing, for moving said first chain;

a first chain sprocket rotatably mounted on said first carriage and arranged to operatively engage said upwardly moving chain portion and arranged to normally idly spin with chain motion;

a second chain sprocket rotatably mounted on said carriage, and arranged to operatively engage said downwardly moving chain portion and arranged to normally idly spin with chain motion;

first control means, secured to said first carriage, for permitting the spinning of said first chain sprocket when in a first state and for preventing the spinning of said first chain sprocket when in a second state;

second control means secured to said first carriage, for permitting the spinning of said second chain sprocket when in a first state and for preventing the spinning of said second chain sprocket when in a second state;

a control valve secured to said carriage, operatively connected to said first and second control means, and arranged to shift between first and second control states wherein said first control means is in its first state and said second control means is in its second state when said control valve is in said first control state and wherein said first control means is in its second state and said second control means is in its first state when said control valve is in said second control state;

means movably secured to said first housing for shifting said control valve between said first and second control states;

a second housing;

a second carriage movably mounted in said second housing;

a second chain having one end fixed to said first carriage and the other end free; and means secured to said second carriage for adjustably grasping said second chain intermediate its ends.

2. A dual carriage reciprocator comprising:

a first housing;

a first carriage movably mounted in said first housing;

a first chain movably mounted in said first housing and arranged to present opposite directions of chain motion to opposite sides of said first carriage;

means, operatively connected to said first chain, for moving said first chain in a predetermined direction;

a first chain sprocket rotatably mounted on said first carriage, engaging a portion of said first chain moving in a first direction with respect to said carriage, and normally spinning with chain motion;

a first air brake mounted on said first carriage and arranged to move between a first position, wherein said first chain sprocket is braked, and a second position, wherein said first chain sprocket is free to spin with chain motion;

a second chain sprocket rotatably mounted on said first carriage, engaging a portion of said chain moving in a second direction with respect to said carriage and normally spinning with chain motion;

a second air brake mounted on said first carriage and arranged to move between a first position wherein said second chain sprocket is braked, and a second position, wherein said second chain sprocket is free to spin with chain motion;

a source of compressed air;

an air valve secured to said first carriage, operatively connected to said first and second air brakes and to said source, and arranged to shift between a first state, wherein said first air brake is urged to its first position and said second air brake is urged to its second position, and a second state, wherein said first air brake is urged to its second position and said second air brake is urged to its first position;

means movably mounted on said first housing for shifting said air valve between said first and second states;

a second housing;

a second carriage movably mounted in said second housing;

a second chain having one end fixed to said first carriage and the other end free; and means secured to said second carriage for adjustably grasping said second chain intermediate its ends.

3. A dual vertical carriage reciprocator according to claim 2 wherein said first and second brakes each comprise:

a cylinder provided with an axially extending hub, two bosses extending parallel to said hub and radially spaced therefrom, and a fluid port;

a cylindrical piston, arranged to be carried by said hub, provided with a central aperture which accommodates said hub, two recesses extending parallel to said aperture and radially spaced therefrom which recesses accommodate said bosses, and first and second radially spaced grooves having fluid sealing rings therein; and a friction liner secured to said piston.

4. A dual carriage reciprocator according to claim 3 wherein said air valve comprises:

a four-way, pilot operated, two position spool valve.

* * * * *